United States Patent [19]

Smith et al.

[11] 3,854,523

[45] Dec. 17, 1974

[54] LIQUID HEAT EXCHANGE SYSTEM

[75] Inventors: Frank T. Smith; Robert D. Smith, both of Wilmington, Del.

[73] Assignee: E. I. du Pont de Nemours and Company, Wilmington, Del.

[22] Filed: May 4, 1973

[21] Appl. No.: 357,078

Related U.S. Application Data

[60] Division of Ser. No. 173,108, Aug. 19, 1971, , and a continuation-in-part of Ser. No. 63,851, Aug. 14, 1970, abandoned.

[52] U.S. Cl. .................................... 165/1, 165/163
[51] Int. Cl. ............................................. F28d 7/00
[58] Field of Search ........ 165/1, 158, 163, 143, 145

[56] References Cited
UNITED STATES PATENTS 3,526,274  9/1970  Gardner............................. 165/166
3,662,817  5/1972  Kendrick et al. .................. 165/145

*Primary Examiner*—Charles Sukalo

[57] ABSTRACT

Disclosed herein is a heat exchanger for altering the temperature of process streams by the use of a plurality of tube bundles made of organic polymeric material disposed within at least one tank having process stream inlet and outlet means. The end portions of the tube bundles are operatively connected to feed and discharge means forming a passageway for circulation of a second liquid through the tube bundles. The tube bundles extend the entire length of the tank and in combination with flow distribution means form an uninterrupted heat exchange region through which only process liquid passing through the heat exchange region leaves the tank.

7 Claims, 8 Drawing Figures

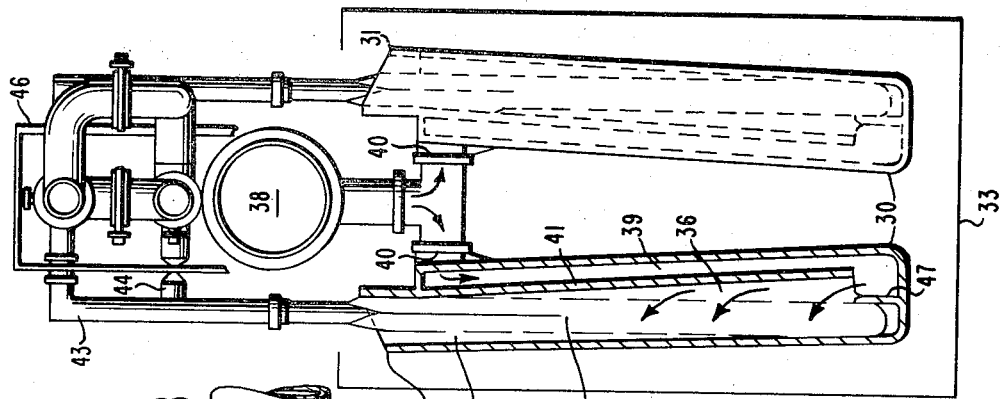
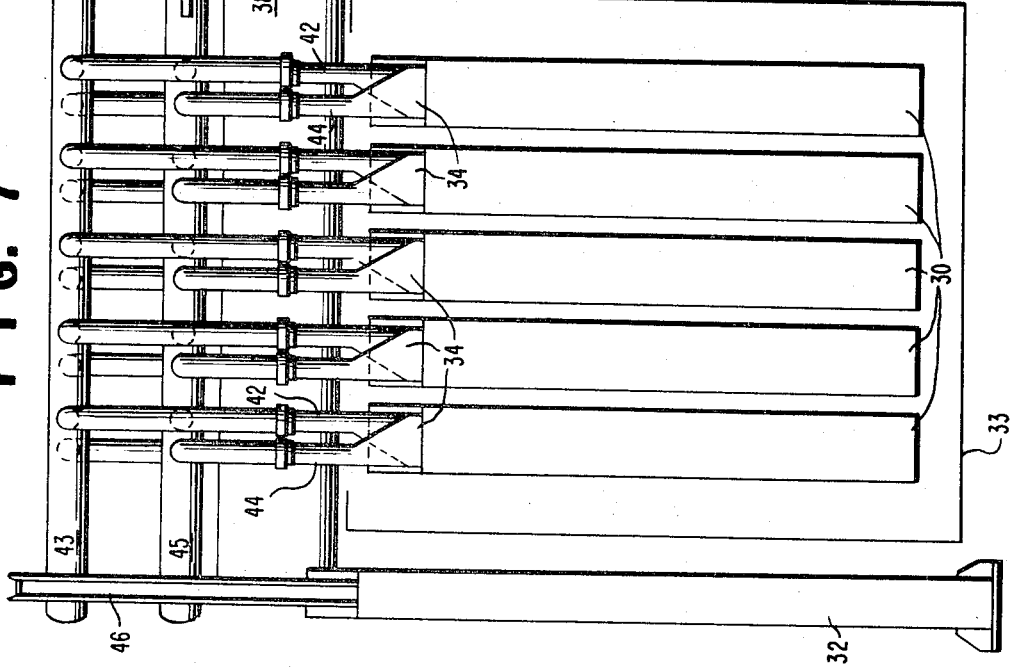

LIQUID HEAT EXCHANGE SYSTEM

CROSS-REFERENCE TO RELATED APPLICATION

This is a division of application Ser. No. 173,108, filed Aug. 19, 1971.

This application is a continuation-in-part of U.S. patent application Ser. No. 63,851, filed on Aug. 14, 1970, now abandoned.

BACKGROUND OF THE INVENTION

The present invention relates to an improved heat exchanger for exchanging heat between two liquids. More specifically, it relates to an apparatus for cooling large volumes of hot corrosive liquids under process stream conditions. More specifically still, it relates to a new and improved heat exchange apparatus for cooling hot sulphuric acid.

In the manufacture of sulphuric acid, particularly in the absorbing tower system where sulphur trioxide is permeated through dilute acid to increase the concentration of the acid, the temperature of the acid may rise as high as 236°F. Acid at the elevated temperature not only has lost its ability to absorb more sulphur trioxide gas but is strongly corrosive on the pipes, pumps and tanks in which it is confined, and thus must be cooled to at least 160°F. before further processing or storage. In a commercial acid plant, it is not uncommon to circulate 6,500 gallons of hot acid per minute through a typical absorbing tower system; hence, to cool this quantity of corrosive liquid is an exceedingly difficult task.

The most common technique employed currently is circulation of the hot acid through tubes or pipes in the form of stacked hollow castings, coils, loops or parallel spiral plates. Depending on the specific acid properties, the cooling pipes may be made of steel, cast iron or lead. Actual cooling is accomplished by trickling or spraying a mist of water over the outer surfaces of the coolers or through cooling passages.

It is well known that maximum heat transfer is obtained between a liquid and a surface when the velocity of the liquid is in the turbulent flow condition which is usually achieved by sufficiently increasing the velocity of the liquid. In the case of the relatively viscous concentrated sulphuric acid, fluid velocity necessary to produce the desired tubulent flow condition is far too high to avoid accelerated corrosion of the coolers. Consequently, the acid is circulated at less than optimum flow conditions at the expense of a correspondingly lower heat transfer efficiency through the tubes. To offset this disadvantage, extra heat exchange capacity must be provided to obtain a reasonable amount of heat exchange surface. As a result, heat exchangers of this type are inherently very large installations involving substantial capital investment and plant space. These installations are also high maintenance items for the tubes are continuously under corrosive attack internally by the hot acid and externally by the intermittent wetting and drying action of the cooling mist. Ultimately, the tubes disintegrate and leaks occur. In such event, a typical maintenance sequence usually requires location of the source of leakage, removal of the heat exchanger from process service, draining the acid from the malfunctioning portion and replacement of the defective pipes. All of this is costly, time-consuming and hazardous to personnel. More importantly, leakages in the heat exchanger pipes are not only a serious source of loss of valuable acid but also a source of environmental pollution. Numerous attempts to provide improved heat exchange systems for obviating the aforementioned difficulties have only been partially successful. A notable example is the sulphuric acid cooler of U.S. Pat. No. 3,373,802 to J. E. Wiklund et al., which is a compact heat exchanger apparatus made up of groups of U-shaped tubes submerged in a liquid storage chamber. Each tube is connected to fluid inlets and outlets forming a passageway for circulation of cooling fluid such as water. The tubes are arranged in sector-like groups within the liquid chamber for easy removal for repair and inspection. To minimize the corrosive action of the incoming hot acid on the cooling tubes, a propelling means is provided centrally in the chamber to counteract the inflow of liquid at the inlet by mixing the hot liquid with the already cooled liquid. In such a device a powerful back-mixing condition is generated in the exchanger apparatus to reduce the temperature differential in the liquid and thereby minimize the adverse effects of the hot acid. This back mixing causes all of the liquid in the tank to reach a uniform temperature. As such the mixing action unfortunately has the tendency of diminishing the overall heat transfer efficiency of the apparatus and thus a typical apparatus must be fabricated with excess heat transfer capacity.

Accordingly, a primary object of the present invention is to provide an improved relatively compact heat exchanger apparatus for use with a large volume of hot corrosive liquid. An auxiliary object of the present invention is to provide an improved heat transfer apparatus capable of utilizing the significantly higher temperature gradient between the incoming corrosive liquid and the second liquid.

Another object of the present invention is to provide an improved heat exchanger for use in cooling hot corrosive liquids wherein the volume of the corrosive liquid passing through a unit area of the heat exchange region is substantially equal over the entire length of the heat exchange region.

Still another object of the present invention is to provide an improved heat exchanger apparatus which is corrosion-resistant, readily replaceable, and easily integrated into otherwise necessary components of an existing acid system, without the necessity for long lengths of expensive and troublesome acid piping and without the necessity for construction of cooling water spray systems, housings or shells to maintain contact between cooling water and acid, thereby eliminating the entire bulky complex commonly referred to as the cooling park, or cooling pit.

SUMMARY OF THE INVENTION

The aforementioned objects are attained by providing at least one tank with first inlet and outlet means for receiving a first liquid; at least one heat exchange tube bundle of flexible organic polymeric material disposed within each tank and extending the length of each tank to define an unbroken heat exchange region, dividing said tank into an input side and an output side; second inlet and outlet means connected to the end portions of the tube bundles for circulation of a second liquid therethrough, and means disposed within each tank, between the inlet and the heat exchange region, for distributing the heat exchange liquid uniformly through the heat exchange region.

This structure can be used to either heat or cool the process stream, depending upon the particular needs of the system. In one embodiment, the process stream is introduced into the center of an annular heat exchange region and forced out through the annular heat exchange region by the flow distributor. In another embodiment the liquid is introduced on the outside of an annular heat exchange region and forced inward by the flow distributor. In a third embodiment, a plurality of tanks, each containing at least one hairpin-shape tube bundle, are provided and the process stream is divided into a plurality of small streams, each of which are fed to a different tank and forced from one side of the tank to the other, through the heat exchange region formed by the tube bundle.

In the preferred embodiment, the tube bundles are hairpin-shaped tube bundles and the tank or tanks are open at the top and immersed into an existing liquid storage container, such that the outlet means remains above the level of the liquid in the liquid storage container, regardless of the liquid level in that container. A particle receiving chamber is also provided at the base of the tank for collecting debris entrained in the first liquid.

The present invention is particularly useful in sulphuric acid manufacture where large volume storage or pump tanks are normally required to accommodate the hot acid in the drying and absorbing tower systems when systems are not in operation. In operation, the acid is pumped from these tanks through banks of cast iron or lead pipe heat exchangers and cooled and circulated through the tower system. The present invention is easily integrated into the acid cooling system by immersion of the bundle containing tanks into an existing acid pump tank and thereby eliminating the need for the space-consuming cast iron pipe heat exchangers. By providing a heat exchanger configuration that prevents back-mixing of the hot and cooled liquid in the tank, the efficiency of the heat exchanger is substantially increased enabling a relatively compact apparatus to cool large volumes of liquid heretofore not considered practical. The volume occupied by such a modular cooler is usually less than 1% of the plant space normally occupied by the aforementioned conventional cooling systems. It is noted that while the present invention is especially useful in cooling hot acid, it is equally useful in heating or cooling large volumes of a great variety of liquids, both corrosive and noncorrosive, such as may be encountered in food, biomedical processing and the like.

BRIEF DESCRIPTION OF THE DRAWINGS

The advantages of the recent invention are best understood by reference to the following drawings in which:

FIG. 7 is a sectional side view of another embodiment of the present invention, characterized by the use of a plurality of tubes each containing at least one tube bundle.

FIG. 8 is a sectional end view of the embodiment shown in FIG. 7.

DETAILED DESCRIPTION OF THE DRAWING

Figure 1:
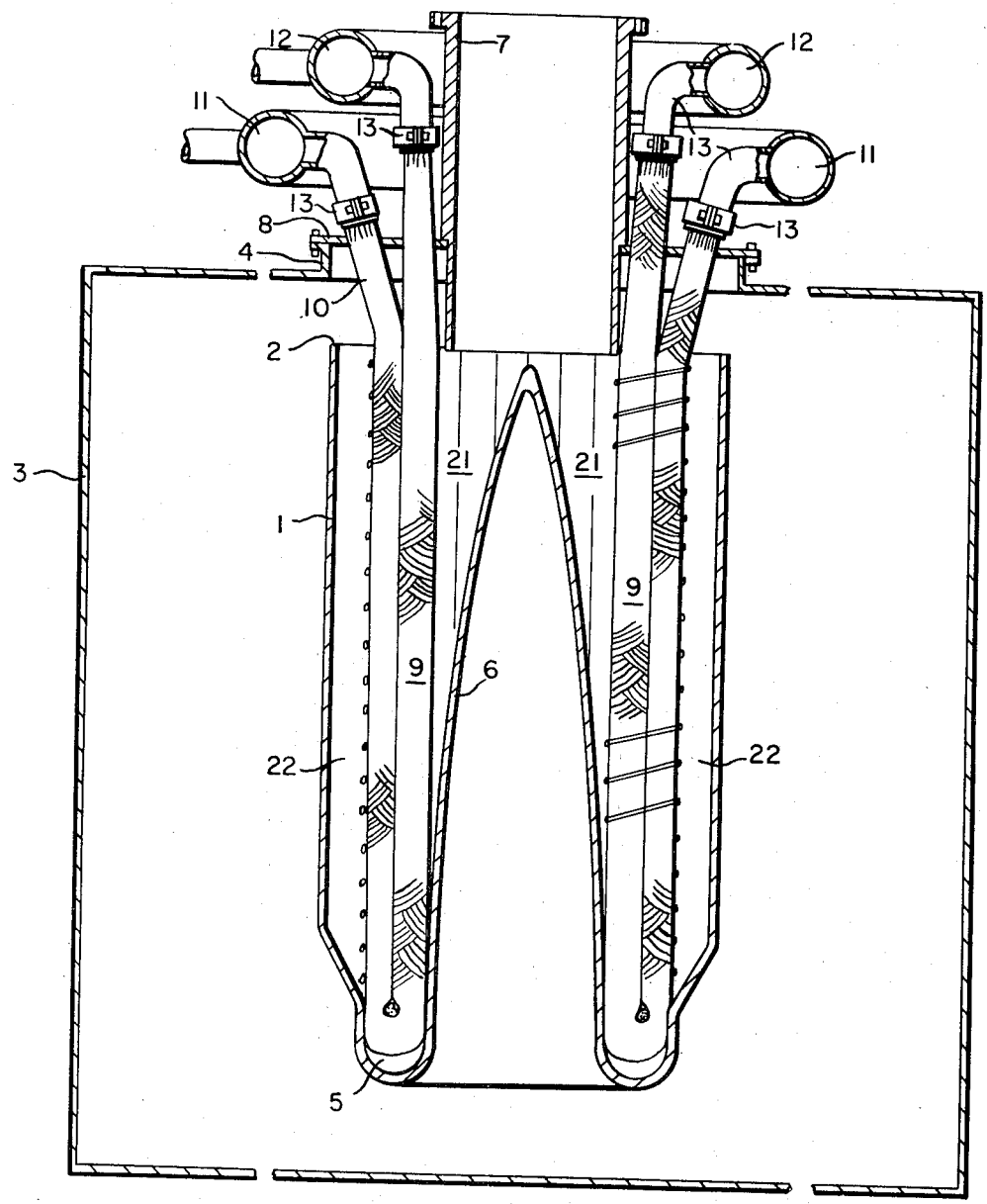
FIG. 1 is a section elevation view of one embodiment of the present invention showing a plurality of hairpin-shaped tubular elements arranged concentrically around an internal ogive-shaped flow distributor forming an annular heat exchange region disposed in a tub or tank which has a rim at the open end that serves as an overflow weir.
Figure 2:
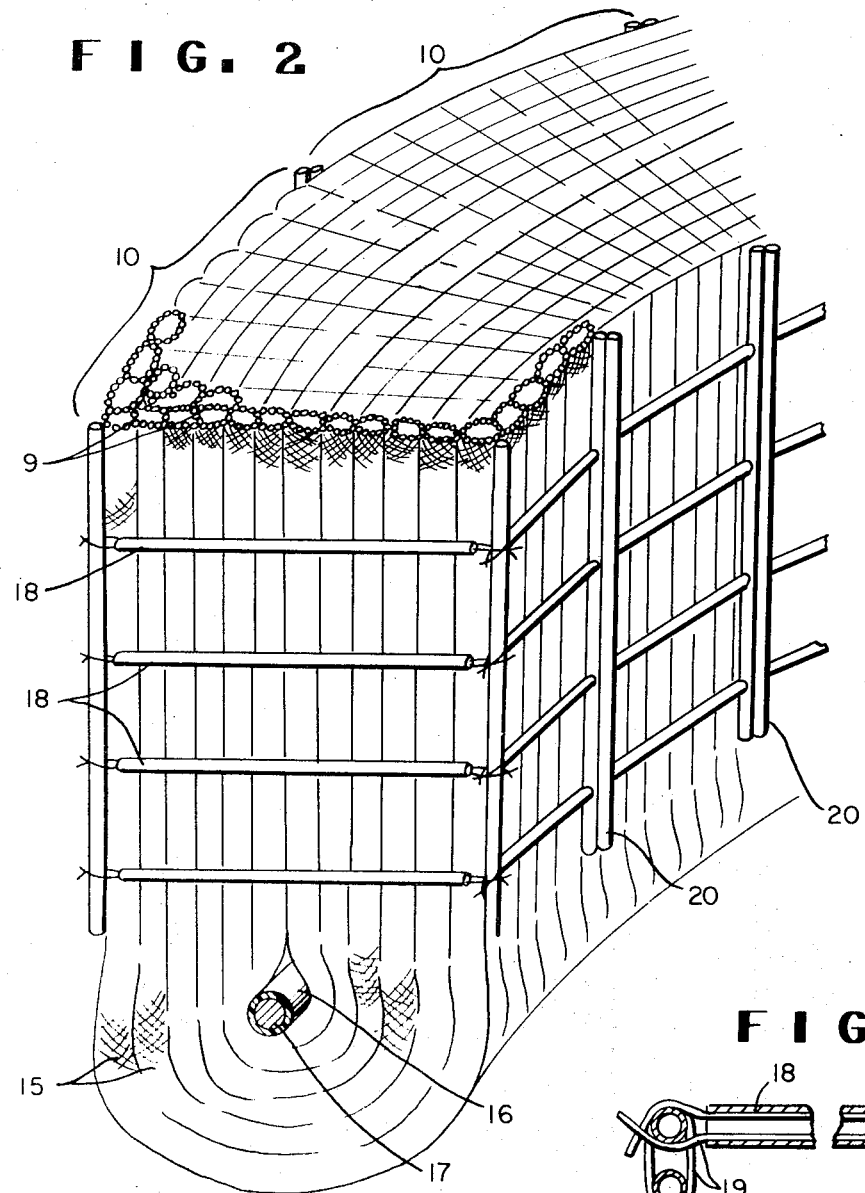
FIG. 2 is a partial section view of the annular heat exchange region of FIG. 1 composed of a plurality of tubular bundles containing hairpin-shaped organic polymeric tubes braided into ropes and laced together to light-weight corrosion-resistant metal spacers and frames.
Figure 5:
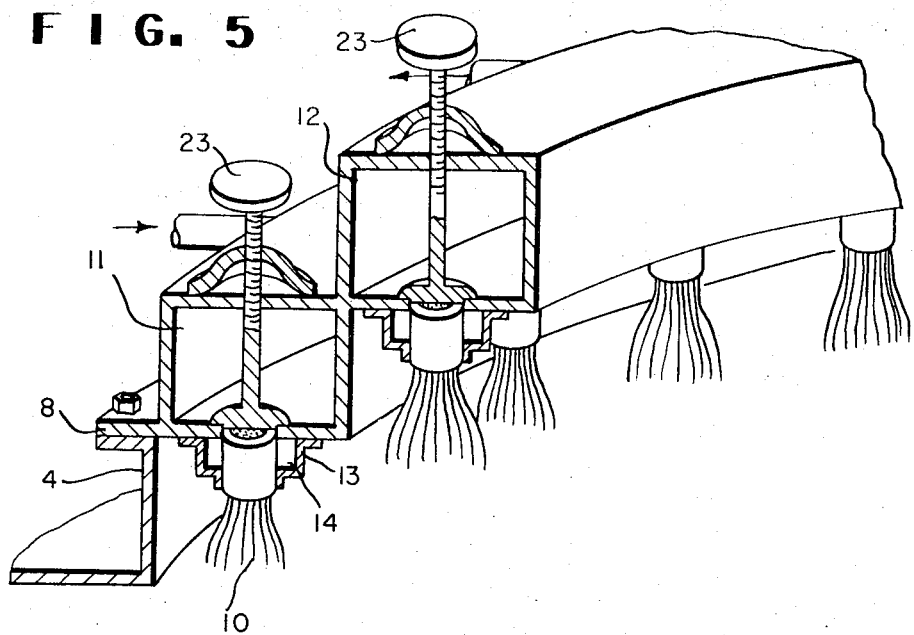
FIG. 5 is a partial section view of one embodiment of the coolant liquid circulation system showing the feed and receiver headers, the tubular bundle attachments and the cutoff valves.

Referring to FIG. 1, a cylindrical tank 1 open at one end and having a rim thereat which functions as an overflow weir 2 is provided. Tank 1 may be constructed of a suitable corrosion-resistant material such as alloy steel, glass reinforced resins and the like, provided it is sufficiently structurally rigid to support a plurality of heat exchange elements which are described in detail below. In the preferred embodiment, tank 1 is made of cast iron and is suppported in a large storage tank or reservoir. In the instant case, the tank is immersed in an existing acid holdup or pump tank 3 through a manhole 4 provided for that purpose. Tank 1 is of sufficient height to assure the level of the acid in the pump tank 3 remains below the overflow weir 2. Internally, the base of tank 1 is modified by a narrow annular recession or channel 5 which serves as a particle trap for residue that may be entrained in the incoming liquid. Concentric with channel 5 is an ogive-shaped flow distributor 6 that extends upward along the longitudinal axis of tank 1. The tip of distributor 6 terminates slightly below the level of overflow weir 2 directly opposite the mouth of an inlet pipe 7 that protrudes through a cover 8 over manhole 4 and is connected upstream to the output of a sulphuric acid absorbing tower system (not shown). Between the distributor 6 and the wall of tank 1 is an annular heat exchange region 9 which as shown in FIG. 2, is composed of a plurality of hairpin-shaped tubular bundles 10 made from flexible organic polymeric composition arranged side-by-side to form an uninterrupted annular array of heat exchange elements. The terminal portions of the hairpin loops of each bundle 10 are reworked into an end structure such as the honeycomb tube sheet structure described in the Assignee's U.S. Pat. No. 3,315,740. The outer leg of this hairpin loop is coupled to a coolant feed header 11 and the inner leg is coupled to a coolant receiver header 12. As shown in FIG. 1, both headers are welded circular structures forming an integral part of manhole cover 8. The loops are attached to the respective headers in a fluid-tight manner by means of flange caps 13 and O-ring gaskets 14, which are better seen by reference to FIG. 5, illustrating another embodiment of the header assembly containing individual shut-off valves 23 for each loop. Caps 13 are secured to the headers by conventional threaded fasteners and serve as supports from which the bundles 10 hang freely.

Figure 4:
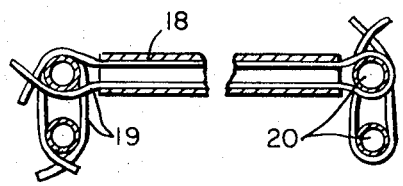
FIG. 4 is a detail view of a typical spacer and frame assembly fastened together with deformable corrosion-resistant ties.
Figure 3:
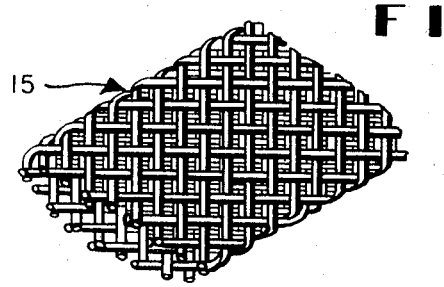
FIG. 3 is an end view of a typical flattened braided rope showing the net-like arrangement of small diameter flexible organic polymeric tubes.

Referring to FIGS. 2, 3 and 4, each loop is composed of a plurality of small diameter tubes braided together, as shown in FIG. 3, to form tubular ropes 15. In one embodiment, there are 48 ropes in each tubular bundle with each rope containing 64 tubes having a diameter between 0.1 to 0.25 inch. In the preferred embodiment, the tubes are made of fluorocarbon organic polymeric composition such as Teflon. Thus, each tubular bundle 10 is composed of about 3,072 tubes so that a typical heat exchange region 9 composed of ten bundles, may contain as much as 30,000 tubes through which a coolant is circulated.

As was mentioned previously, the flexible tubular elements hang freely. Thus, to assure the annular integrity of the uninterrupted heat exchange region 9, an anchor sack 16 made of suitable corrosion-resistant material such as "Teflon" and containing lead shot 17 may be placed within the bend portions of the bundles 10 to maintain the tubular elements compact and straight. The annular shape of the heat exchange region 9 is further maintained by spacers 18 and metal frames 20. As shown in FIGS. 2 and 4, each frame 20 is a partly curved section made of light-weight corrosion-resistant metal laced to the tubular bundles 10 and adjacent frames by deformable ties 19. Spacers 18 and metal frames 20 help stiffen the tubular bundle 10 assembly, thereby facilitate its assembly and removal from tank 1. In the assembled condition, frames 20 also serve to establish and define a flow chamber 21 between the distributor 6 and the inner side of the heat exchanger region 9 and a collection chamber 22 between the outer side of the heat exchange region 9 and the tank 1 wall. Chamber 21 is a variable volume space designed to distribute the incoming hot liquid stream equally over the entire length of the region 9 with a minimum reduction in stream velocity. Chamber 22 provides a collection zone for the cooled liquid before it leaves the tank 1 across overflow weir 2.

In operation, coolant water is introduced into the tubular bundles 10 from header 11 directed down through the outside loops, upward through the inside loops and into outlet header 12 where it is suitably disposed. The above flow path offers the advantages and benefits of two pass fluid flow systems but with only single pass of the hot liquid. Since each tubular bundle 10 is connected to headers 11 and 12 independent of the other bundles, the parallel type connection offers a number of advantages, principally the ability to maintain a constant high temperature gradient between the tube side coolant fluid and the cross flowing hot acid on the shell side. As shown in FIG. 5, each tubular bundle 10 may be adapted with valves 23 to shut off coolant liquid in the event of leakage due to tube rupture. This enables isolation of a malfunctioning bundle 10 and continued operation of the apparatus until the next scheduled shutdown without detrimental dilution and contamination of the acid undergoing treatment.

Because the coolant liquid is circulated through such a large multiplicity of tubes, it should be noted that the quantity of leakage resulting from rupture of one or several tubes is virtually insignificant, and the need to isolate a single tubular bundle 10 due to leakage will be quite infrequent. Accordingly, a stream of hot acid to be cooled in the apparatus is introduced into tank 1, diverted around distributor 6, distributed along chamber 21, directed one time through the annular array of tubular bundles 10 and collected in receiver chamber 22 where it eventually leaves tank 1 across overflow weir 2. As the hot liquid enters chamber 21, the variable volume induces the flow to uniformly distribute across the entire annular heat exchange region 9 at substantially constant velocity.

Upon passage through the heat exchange region 9, cooled acid collects in chamber 22. Back pressure of the incoming liquid prevents back flow and intermixing; hence, the cooled liquid overflows across weir 2 into the pump tank 3. The aforementioned arrangement produces a single pass through the heat exchange region 9 with no intermixing. This enables maintenance of a substantial temperature gradient between the incoming and outgoing liquid, and thus is most effective in cooling of large quantities of liquid. In a typical operation, the apparatus is capable of cooling 180,000 gallons per hour of hot acid from 220°F. to 100°F.

In view of the net-like structure of the closely spaced heat exchange tubes, care must be taken to prevent the heat exchange region 9 from being fouled by particles and debris that may be entrained in the hot acid stream. For most conditions, the change in velocity occurring in the input chamber 21 is sufficient to encourage settling of the larger particles in channel 5. For heavily sedimented and contaminated acid, however, more elaborate means may be necessary.

Figure 6:
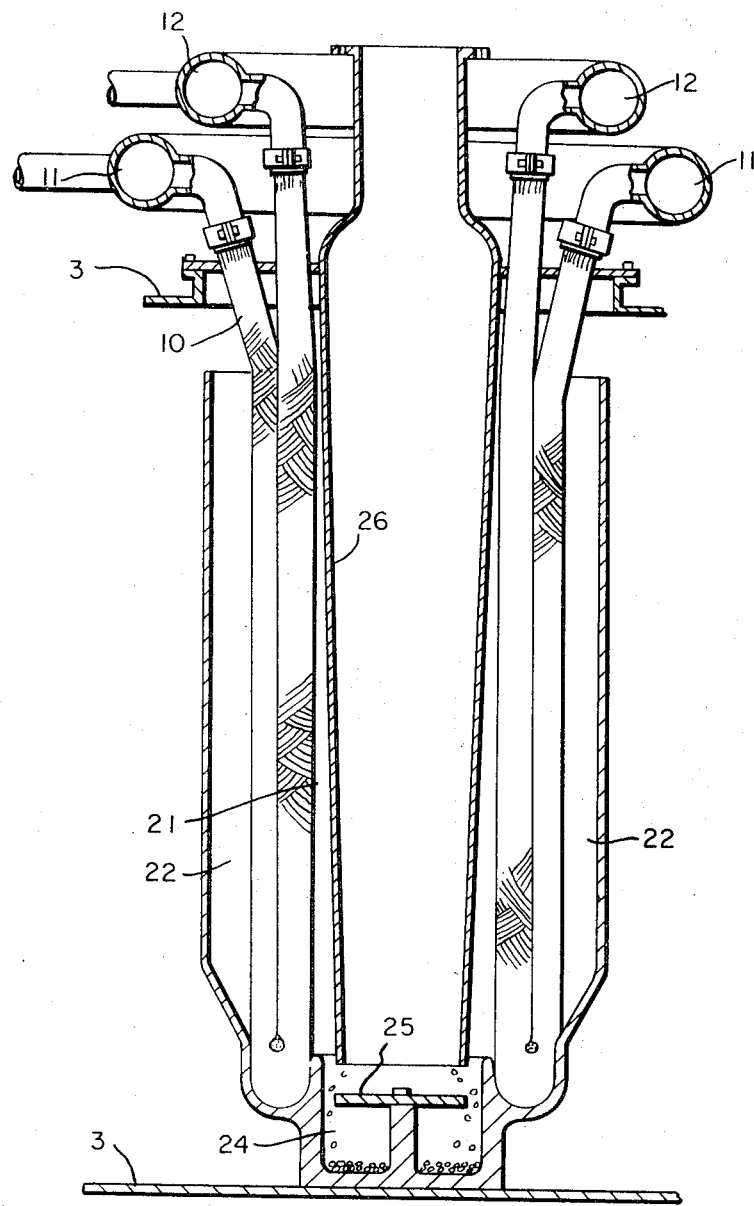
FIG. 6 is a section elevation view of an alternative embodiment of the present invention featuring a tapered center feed nozzle extending substantially the entire distance into the tank terminating opposite a shielded particle trap at the base.

In FIG. 6, an alternative embodiment is shown featuring a particle trap 24 at the base of tank 1 shielded by a plate 25. Trap 24 is located directly opposite the mouth of inlet nozzle 26 which extends the entire distance into tank 1. Nozzle 26 is modified by a continuously decreasing cross section so that it helps form a variable volume input chamber 21. In operation, the hot acid introduced through nozzle 26 is forced to undergo a 180° reversal of flow direction at the base of tank 1 before entry to chamber 21. The change in direction causes an abrupt reduction in velocity and an accompanying drop in the energy level of the liquid, thereby releasing any entrained particles which would otherwise tend to foul the exchange region 9. The material quickly settles into trap 24 for removal at a later scheduled shutdown. Shield plate 25 protects the deposited material from being washed out by the incoming flow stream.

FIGS. 7 and 8 illustrate another embodiment of the present invention. In this embodiment, a plurality of rectangularly-shaped elongated tanks 30, made from suitable corrosion-resistant material, each having a first inlet means 40 and a first outlet means 31, are provided. In this embodiment, the first outlet means consists of a rim which functions as an overflow weir. The tanks are supported by columns 32 and immersed in a larger tank 33 which can be an existing acid holdup or pump tank. A plurality of hairpin-shaped tubular bundles 34, each consisting of a plurality of small, diameter, flexible, tubular elements made from an organic polymeric composition, are also provided. At least one of these tube bundles is disposed within each of the tanks, extending substantially from the top to the bottom of the tank, to define an unbroken heat exchange region 35 dividing the tank into an input side 36 and an output side 37. A first conduit 38 is provided to supply the first inlet means 40 with a supply of liquid, which in the present embodiment is a process stream. The process stream is directed to the bottom of the tank through channel 39 and, as indicated by the arrows, is forced through the heat exchange region 35 by the flow distributing action of wall 41, which functions to keep the volume of fluid passing through each unit area of the heat exchange region 35 substantially equal. The terminal portions of the hairpin loops are reworked into an end structure, as described above. The leg of the hairpin loop is coupled to an inlet means 42 and a coolant feed header 43 and the inner leg is coupled to an outlet means 44 and a coolant receiver header 45. The entire structure is supported above the tanks by support 46. A support wall 47 is provided in each tank to prevent the tube bundles from shifting within the tank.

The above discussion has been limited to the embodiment using hairpin-shaped tube bundles which is to be preferred, especially in use with corrosive liquids, because the header assemblies can be kept out of the corrosive liquid. The present invention, however, contemplates the use of straight tube bundles with an inlet at one end and an outlet at the other end of the annular heat exchange region. Such a configuration could be used if noncorrosive liquids were used. The above discussion, thus, is for the purpose of illustrating the usefulness of the present invention and is not meant to limit the scope of the invention as set forth in the following claims.

What is claimed is:

1. An apparatus for accomplishing heat exchange between a flowing first liquid and a second liquid having a temperature significantly different from that of the first liquid which comprises
   a. a tank having an input means for receiving the flowing first liquid and an output means by which the flowing first liquid exits,
   b. a plurality of tube bundles each of which comprises a plurality of small diameter flexible tubes made from an organic polymer composition, one end of each of which bundles is coupled to an inlet means while the other end is coupled to an outlet means to permit the flow of the second liquid through the interior of the tubes, each tube bundle being disposed within and extending substantially from the top to the bottom of the tank and in relationship to the input and output means of the tank such that a substantially unbroken annular heat exchange region is provided and the tank is divided into an input side and an output side,
   c. means for directing the passage of a substantially uniform volume of the first liquid from the input side to the output side of the tank and through each unit area of the annular heat exchange region,
   d. particle trapping means, located at the bottom of said tank adjacent to the input region for receiving and containing particles carried by said flowing first liquid before it passes through said annular heat exchange region.

2. An apparatus for accomplishing heat exchange between a flowing first liquid and a second liquid having a temperature significantly different from that of the first liquid which comprises
   a. a cylindrical tank having an input means for receiving the flowing first liquid and an output means by which the flowing first liquid exits,
   b. a plurality of hairpin-shaped tube bundles comprising a plurality of small diameter flexible tubes made from a fluorocarbon polymer composition, each tube bundle being arranged within the cylindrical tank such that one leg of each hairpin-shaped bundle is located radially inward and coupled to the inlet means while the other leg is located radially outward and coupled to the outlet means to permit the flow of the second liquid through the interior of the tubes and define a heat exchange region,
   c. an ogive means for directing the passage of a substantially uniform volume of the first liquid through the heat exchange region from the inward leg of the hairpin-shaped tube bundles to the outward leg,
   d. particle trapping means, located at the bottom of said tank within the cylindrical array of tube bundles, for receiving and containing particles carried by said flowing first liquid.

3. The apparatus of claim 2 wherein: the tubular elements in each of said tube bundles are braided into a close-packed array; wherein the legs of each of said hairpin-shaped bundles are laced together along substantially the entire length of the hairpin; and wherein each tube bundle is laced to the tube bundle adjoining it along substantially the entire length of the hairpin, whereby said cylindrical array of tube bundles presents a substantially continuous and unbroken array of tubular elements to the first liquid flowing therethrough.

4. The apparatus of claim 3 wherein said apparatus further comprises anchoring means to prevent the bottom of said hairpin-shaped bundles from moving substantially away from the bottom of said tank.

5. A process for accomplishing heat exchange between a flowing first liquid and a second liquid comprising the steps of:
   a. providing an annular heat exchange region comprising a plurality of heat exchange bundles, each heat exchange bundle comprising a plurality of relatively flexible, small tubular elements made from an organic polymer composition, and inlet and outlet means operatively connected to the interior of said tubular elements to permit the flow of said second liquid therethrough;
   b. supplying each tubular element in each heat exchange bundle with said second liquid;
   c. introducing said flowing first liquid into an inlet means on one side of said flowing heat exchange region;
   d. directing the flow of said first liquid from one side of said heat exchange region to the other side of said heat exchange region in a manner such that the volume of said first liquid passing through each unit area of said annular heat exchange region is substantially equal over the entire length of said annular heat exchange region;
   e. trapping particles carried by the flowing first liquid; and
   f. removing said flowing first liquid from an outlet means disposed on the opposite side of said annular heat exchange region so that only said first liquid which has passed through said annular heat exchange region will reach said outlet means, whereby a temperature difference is maintained between the first liquid at the inlet means and the first liquid at the outlet means.

6. An apparatus for accomplishing heat exchange between a flowing first liquid and a second liquid having a temperature significantly different from that of the first liquid which comprises a. a plurality of tanks having an input means for receiving a flowing first liquid and an output means by which the flowing first liquid exits, b. at least one hairpin-shaped bundle of a plurality of small diameter flexible tubes made from an organic polymer composition, one end of which is coupled to an inlet means and the other end of which is coupled to an outlet means to permit the flow of the second liquid therethrough, the tube bundle being disposed within and extending substantially from the top to the bottom of each tank in relationship to the input and output means of the tank such that a heat exchange region is provided and the tank is divided into an input side and an output side, c. ogive means disposed within each tank for directing the passage of a substantially uniform volume of the first liquid through each unit area of the heat exchange region, d. particle trapping means located at the bottom of each tank for receiving and containing particles carried by the flowing first liquid.

7. The apparatus of claim 1 wherein said tubular elements are made from a fluorocarbon polymer composition.

* * * * *

UNITED STATES PATENT OFFICE
CERTIFICATE OF CORRECTION

PATENT NO. : 3,854,523
DATED : DECEMBER 17, 1974
INVENTOR(S) : FRANK T. SMITH and ROBERT D. SMITH It is certified that error appears in the above-identified patent and that said Letters Patent are hereby corrected as shown below:

Column 10, line 11, "1" should be -- 6 --.

Signed and Sealed this fourth Day of November 1975

[SEAL]

Attest:

RUTH C. MASON
*Attesting Officer*

C. MARSHALL DANN
*Commissioner of Patents and Trademarks*